Figure 1:
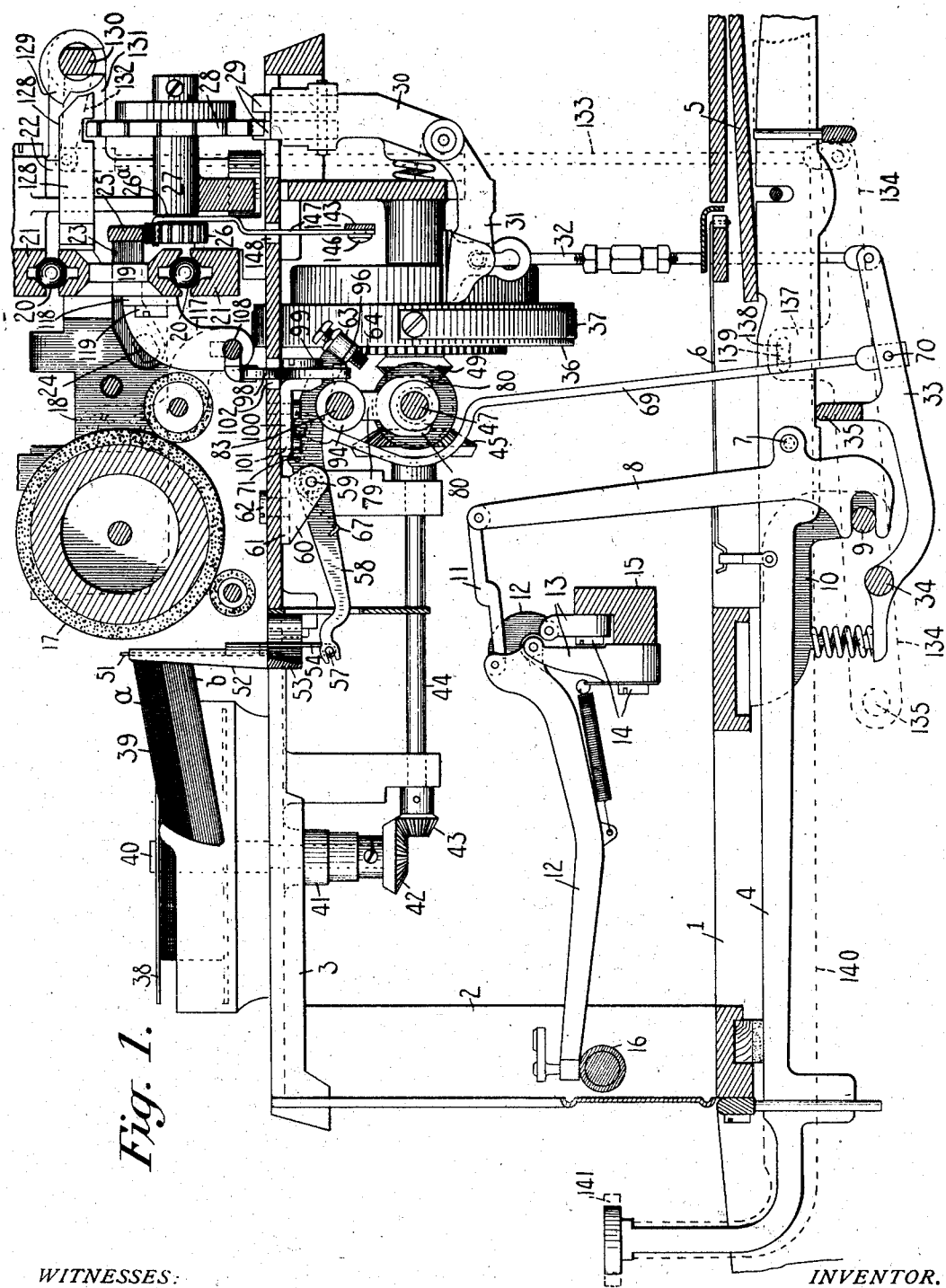

No. 878,573. PATENTED FEB. 11, 1908.
H. H. STEELE.
TYPE WRITING MACHINE.
APPLICATION FILED SEPT. 1, 1906.

5 SHEETS—SHEET 1.

WITNESSES:

INVENTOR.
Herbert H. Steele
BY
ATTORNEY.

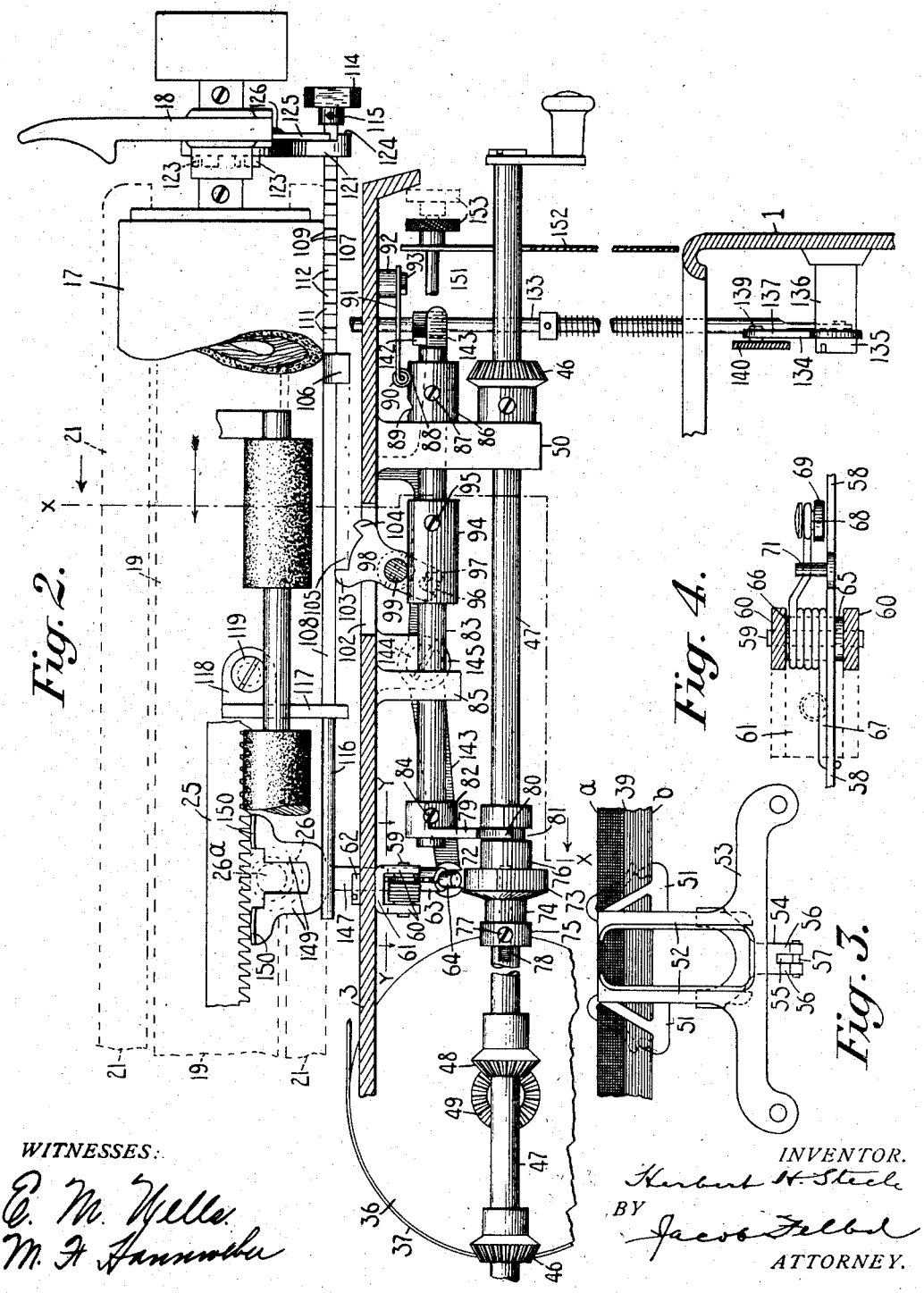

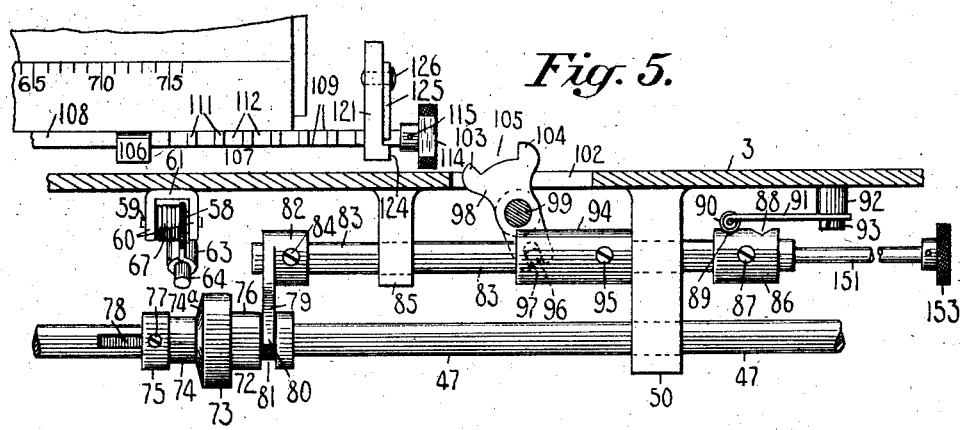
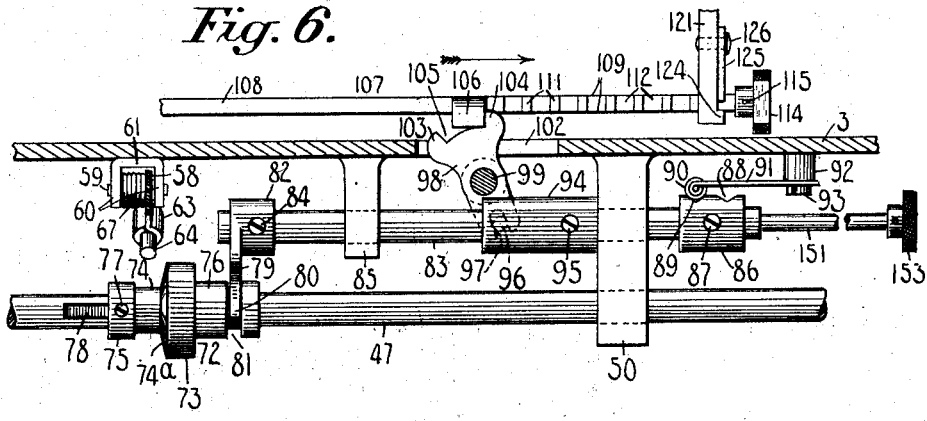
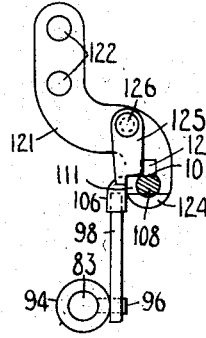
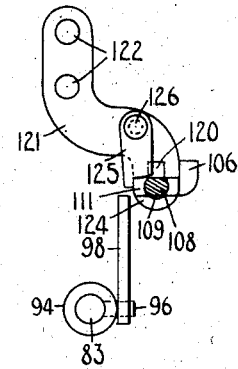
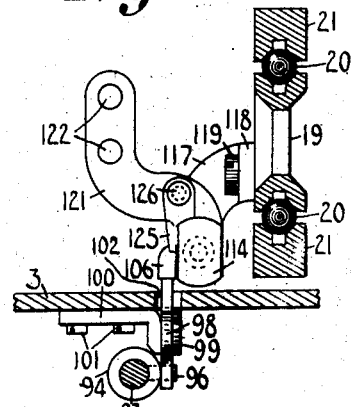

No. 878,573. PATENTED FEB. 11, 1908.
H. H. STEELE.
TYPE WRITING MACHINE.
APPLICATION FILED SEPT. 1, 1906.
5 SHEETS—SHEET 4.
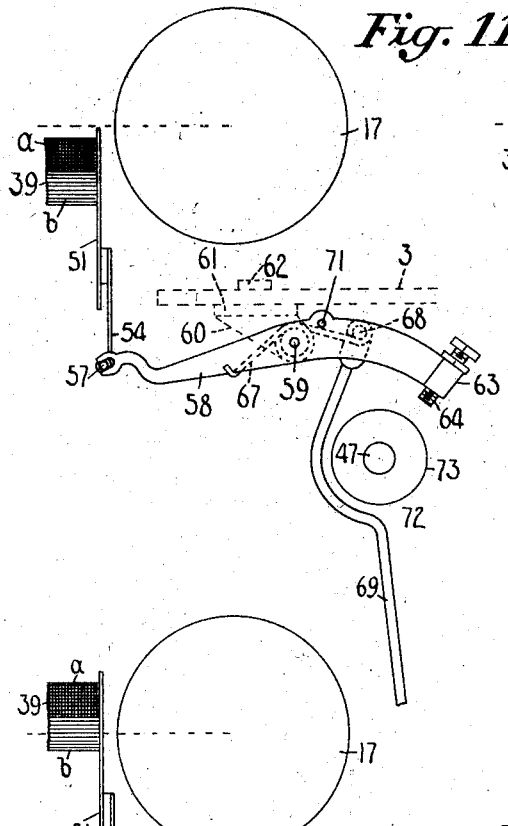
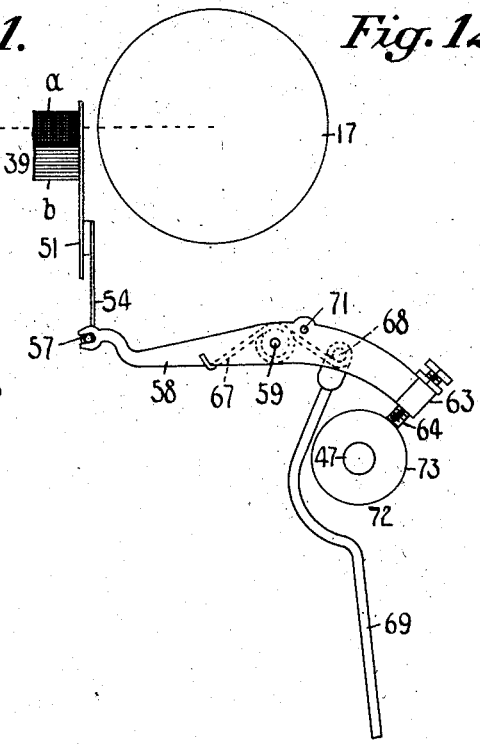
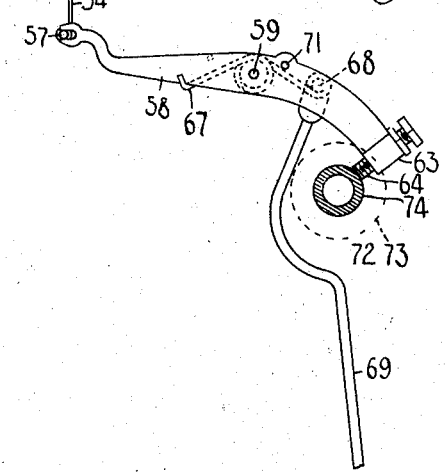
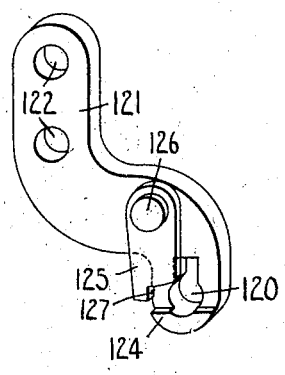
WITNESSES:
E. M. Wells
M. F. Hannreber
INVENTOR.
Herbert H. Steele
BY Jacob Felbel
ATTORNEY.

No. 878,573. PATENTED FEB. 11, 1908.
H. H. STEELE.
TYPE WRITING MACHINE.
APPLICATION FILED SEPT. 1, 1906.
5 SHEETS—SHEET 5.
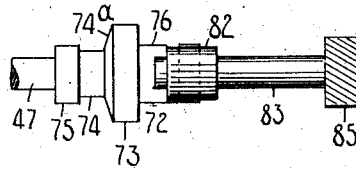
Fig. 15.
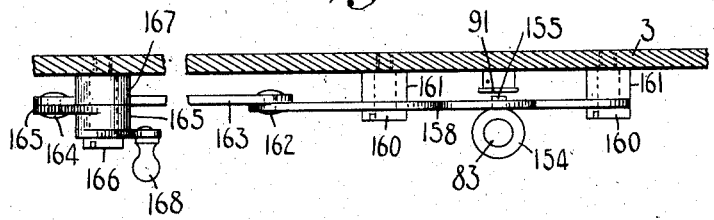
Fig. 16.
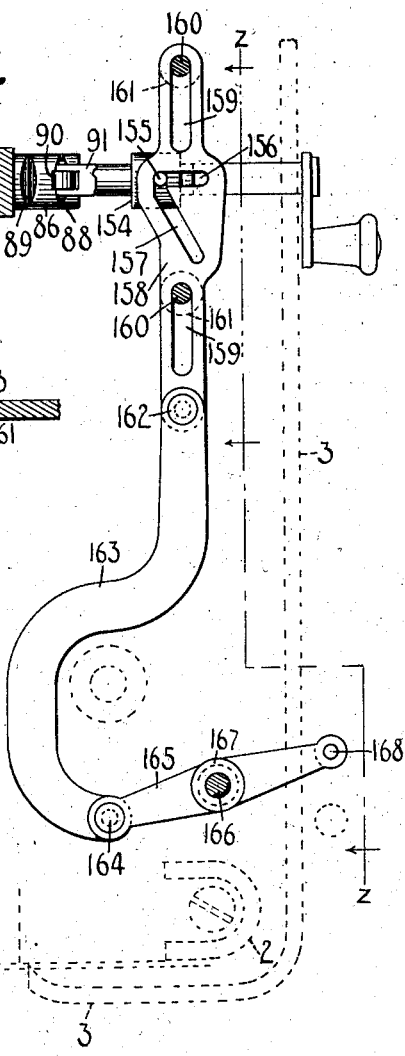
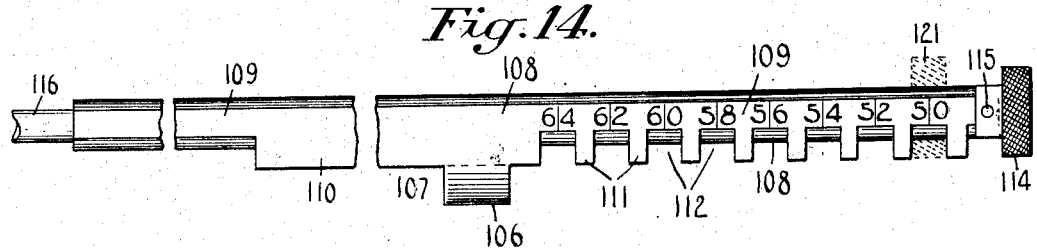
Fig. 14.
WITNESSES:
E. M. Wells.
M. F. Hannweber
INVENTOR.
Herbert H. Steele
BY Jacob Felbel
ATTORNEY.

UNITED STATES PATENT OFFICE.

HERBERT H. STEELE, OF SYRACUSE, NEW YORK, ASSIGNOR TO THE MONARCH TYPEWRITER COMPANY, OF SYRACUSE, NEW YORK, A CORPORATION OF NEW YORK.

TYPE-WRITING MACHINE.

No. 878,573.   Specification of Letters Patent.   Patented Feb. 11, 1908.

Application filed September 1, 1906. Serial No. 332,950.

*To all whom it may concern:*

Be it known that I, HERBERT H. STEELE, citizen of the United States, and resident of Syracuse, in the county of Onondaga and State of New York, have invented certain new and useful Improvements in Type-Writing Machines, of which the following is a specification.

My invention relates to ribbon mechanism for typewriting machines and generally stated has for its object to provide means for changing or shifting automatically at a predetermined point in a line of writing from one field to another of a ribbon having a plurality of fields of different characteristics.

To the above and other ends the invention consists in the features of construction, combinations of devices and arrangements of parts hereinafter fully described and particularly pointed out in the claims.

I have shown my invention as applied to a Monarch front-strike typewriting machine, which machine employs a vibratory ribbon carrier; but it is to be understood that the invention is applicable to other forms of writing machines.

In carrying out my invention in the present instance two coöperating ribbon field shifting members are provided, one on the traveling element or carriage of the machine and the other on a fixed part thereof, said shifting members being relatively adjustable so that they may co-act at varying points in the carriage travel to effect an alteration in the throw of the vibratory ribbon carrier, whereby the working field or stripe of the ribbon may be changed automatically at one or another of a plurality of predetermined points in the writing line. My improvements are preferably employed in connection with tabulating devices, so that if, for example, a two-color ribbon be used the characters in one column on the work sheet may be written in one color, while the characters in an adjacent column may be written in another color. In the present application, the ribbon field shifting members are distinct and separate from the tabulating devices.

In the accompanying drawings, Figure 1 is a full sized longitudinal vertical sectional view of a typewriting machine embodying my invention, parts of the machine being omitted and parts being broken away, the section being taken on a plane represented by the line $x$ $x$ in Fig. 2. Fig. 2 is a fragmentary full sized transverse sectional view taken on a plane forward of the platen. Fig. 3 is a full sized front elevation of the vibratory ribbon carrier and the guide bracket on which said carrier is supported, a part of the ribbon being shown. Fig. 4 is an enlarged fragmentary sectional view taken on the plane represented by the line $y$ $y$ in Fig. 2 and looking in the direction of the arrow at said line, said Fig. 4 showing part of the operating lever for the vibratory ribbon carrier, part of the support in which said operating lever is mounted, and the upper end of the link which actuates said operating lever. Fig. 5 is a view corresponding with Fig. 2 but with some of the parts shown in said Fig. 2 omitted and others of the parts shown in different relations from those in which they appear in said Fig. 2. Fig. 6 is a view corresponding to Fig. 5 but with some of the parts in different relations from those in which they appear in said Fig. 5. Fig. 7 is a full sized fragmentary vertical sectional view of parts of the carriage and frame of the machine and showing also the two coöperating shifting members in end view as they appear from the right-hand side of the machine. Figs. 8 and 9 are detail side elevations illustrating the positions to which that one of the shifting members which is mounted on the carriage will be adjusted. Fig. 10 is an enlarged perspective view of one of the supports of that one of the shifting members which is mounted on the carriage. Figs. 11, 12 and 13 are diagrammatic views illustrating various positions of the vibratory ribbon carrier and its operating devices. Fig. 14 is an enlarged fragmentary top plan view of that one of the shifting members which is mounted on the carriage. Fig. 15 is a horizontal sectional view taken just beneath the top plate of the machine and showing a modification of the means for shifting the ribbon or altering the printing field thereof by hand. Fig. 16 is a fragmentary sectional view taken on planes represented by the line $z$ $z$ in Fig. 15 and looking in the direction of the arrows at said line.

Referring more especially to Figs. 1 and 2, the main frame of the machine comprises a base 1, corner posts 2 (of which only one is shown), and a top plate 3 supported by said posts. Key levers 4 are fulcrumed on a fulcrum plate 5 mounted in the rear of the base, each of said key levers being provided with a restoring spring 6 and having pivoted to it at 7 a sub-lever 8. Said sub-lever is slotted at its lower end portion to coöperate with a fixed abutment or fulcrum rod 9 supported in brackets 10 secured to the base. The upper end of each sub-lever is connected by a link 11 with a type bar 12, each type bar being pivotally mounted in a hanger 13 secured by a screw 14 to a segmental support 15. The hangers are arranged segmentally in sets on the support 15, said support being shiftable in the present instance to change case. The free ends of the type bars 12 are normally supported on a type rest 16 and said type bars, when actuated, coöperating with the front face of a rotary platen 17 mounted in a U-shaped platen frame or carriage composed of side bars 18 and a back bar 19 connecting said side bars at their rear ends. The back or slide bar 19 is provided at its top and bottom with oppositely disposed longitudinal grooves which coöperate with anti-friction balls 20, said balls also coöperating with fixed grooved trackways 21 secured to standards 22 rising from the top plate 3. Horizontally disposed and rearwardly projecting arms 23 are pivoted at 24 in the side bars 18 of the carriage, said arms 23 supporting at their rear ends a carriage rack 25 which normally meshes with a feed pinion 26 secured to a shaft 26ᵃ journaled on a bracket 27 rising from the top plate. A toothed escapement wheel 28 is operatively connected with the shaft 26ᵃ, and coöperative with said escapement wheel are escapement dogs 29 mounted at the top of a vibratory spring restored carrier or rocker 30. The dog rocker 30 is provided with a horizontally disposed and forwardly projecting arm 31 which is connected by a link 32 with a central rearwardly extending arm 33 of a universal bar frame, said universal bar frame comprising a rock shaft 34 journaled at the sides of the base and a universal bar proper 35 extending from side to side of the machine beneath the series of key levers 4. The universal bar is adapted to be operated when any of the key levers is actuated, thereby causing the dog carrier to be vibrated and the dogs 29 to coöperate in a known manner with the escapement wheel 28 to permit the carriage to be drawn a letter space distance at a time leftward across the top plate under the influence of a spring drum 36 with which said carriage is connected by a band or strap 37.

Ribbon spools 38 (only one of which appears in the drawings) are arranged above the top plate 3 one at each side of the machine and forwardly of the platen. A ribbon 39 is wound upon the ribbon spools, said ribbon as herein shown being divided longitudinally into fields a and b of different characteristics; that is to say, the field a may be of one color such as black and the field b of different color such as red, or the field a may be copying ribbon and the field b record ribbon, for example. The ribbon 39 may be fed longitudinally from either spool to the other by any suitable means, that shown in the drawings being substantially the same as that employed in the Monarch machine. Each ribbon spool 38 is carried by an upright shaft 40 (Fig. 1) which rotates in a fixed bearing 41 and has secured to its lower end a small beveled gear 42. The gear 42 meshes with a beveled pinion 43 secured to the forward end of a horizontal shaft 44 which shaft carries at its rear end a beveled pinion 45, said pinion 45 being adapted to mesh with a beveled driving pinion 46 mounted on a driving or power shaft 47. Rotary movement is transmitted to the shaft 47 by beveled pinions 48 and 49, the pinion 48 being operatively connected with the driving shaft and the pinion 49 with the spring drum 36. It will be understood that both ribbon spools are provided with like gear trains which are adapted to be actuated by driving pinions 46 on the shaft 47. The driving shaft 47 is journaled in lugs 50 depending from the under side of the top plate and is capable of both longitudinal and rotary movements in its bearings, the longitudinal position of said driving shaft determining which driving pinion 46 will be in mesh with its coöperating pinion 45 and which ribbon spool will be turned to wind the ribbon thereon.

Midway between the ribbon spools the ribbon 39, as best shown in Figs. 1 and 3, is threaded through a vibratory ribbon carrier or vibrator 51, said vibrator being guided and supported in the upright arms 52 of a guide bracket 53, the latter being suitably secured to the top plate of the machine. The stem 54 of the carrier or vibrator is formed with a slot 55, thereby providing arms 56 which carry a cross pin 57, said cross pin being engaged by the slotted forward end of an operating member or lever 58 which has a pivot or fulcrum pin 59 journaled in the arms 60 of a U-shaped bracket 61 depending from the under side of the top plate and fixedly secured thereto by a headed screw 62. As will be seen the operating lever 58 is pivoted about midway between its ends, thus providing a two-armed lever. The free end of the forward arm of the operating lever is pivotally connected with the vibrator 51 and the free end of the rear arm of said operating lever is curled or turned back on itself as indicated at 63 to provide an opening, the interior of which is threaded and receives an adjustable screw stop 64, which, during the operation of the machine, coöperates with a stop member presently to be described, to effect a positive stoppage of the operating lever 58.

As clearly appears in Fig. 4 limiting collars or sleeves 65 and 66 surround the pivot pin 59 of the operating lever between the arms 60 and serve to prevent lateral movement of said lever towards one or another of the arms 60 of the supporting bracket 61. The collar 65 is comparatively narrow and the collar 66 comparatively wide, the latter being at the left of the operating lever and serving to maintain it at a considerable distance from the left hand arm 60. Coiled around the collar 66 is a wire spring 67, the forward end of which, as clearly appears for example in Fig. 1, is hooked around the lower edge of the operating lever between the pivot of the latter and the vibrator. The rear free end of the spring 67 is coiled around a headed pin or stud 68 extending laterally from the upper end portion of a connecting link 69, the lower end of the latter being pivotally connected at 70 with the arm 33 of the universal bar frame, a yielding or spring connection being thus provided between the connecting link 69 and the operating lever 58. A pin 71 (Figs. 4, 11, 12 and 13) projects laterally leftward from the rear arm of the operating lever, said pin coöperating with the rear portion of the spring 67 to prevent the latter from uncoiling and to limit the upward movement of the link 69 with relation to the lever 58 under the influence of said spring 67. The construction, it will be understood, is such that when a key lever or the spacing levers are operated, the link 69 will be drawn downward and through the spring 67 will actuate the operating lever 58, causing the forward arm of the lever to swing upward and the rear arm of said lever to swing downward. The normal position of the vibrator is such that the ribbon is normally maintained below the printing point, but when the operating lever is actuated the vibrator will be thrown upward to interpose the ribbon between the type on the actuated type bar and the front face of the platen.

By varying the limit of movement of the vibrator towards the printing point one or another of the fields of the ribbon 39 may be rendered operative. In the present instance I prefer to effect this result by providing a stop member adjustable to coöperate with the stop 64 to arrest the operating lever 58 at different points in its travel. Various other ways of effecting the change or shift in the ribbon fields may of course be used. The stop member or ribbon field-changer herein illustrated is clearly shown in Figs. 2, 5 and 6, being designated as a whole by the numeral 72. Said stop member is in the form of a sleeve which is mounted on the ribbon driving shaft 47, and comprises a cylindrical stopping portion 73 of comparatively large diameter, a lesser cylindrical stopping portion 74 joined to the portion 73 by a conec part 74ª, a hub portion 75 adjoining the stopping portion 74 and of somewhat larger diameter than the latter, and a second hub portion 76 at the right of the cylindrical stopping portion 73. The hub portion 75 receives a screw 77, the inner end of which engages with a slot 78 formed in the driving shaft 47, the construction being such that the stop member 72 may move lengthwise of said shaft and relatively thereto but is caused to turn with said shaft when the latter is rotated. It will be apparent that by moving the stop member 72 lengthwise of the driving shaft, one or another of the stopping portions 73 and 74 will be brought into position to coöperate with the screw stop 64 when the operating lever is actuated by any of the key levers. The construction is such and the parts are so proportioned that when the operating lever is arrested by the stop portion 73 the ribbon will have been lifted far enough to bring the top field or stripe a to the printing point while if the stop portion 74 is operative the ribbon will be lifted still higher before the operating lever is arrested and consequently the lower field or stripe b of said ribbon will be brought to the printing point.

In the present instance, in order to effect an automatic change or shift from one ribbon field or stripe to another at a predetermined point or points in the travel of the carriage, I provide devices which operate to shift the stop member 72 lengthwise of the driving shaft to bring one or another of the stop portions 73 or 74 into operative position, said devices being automatically actuated by adjustable means carried by the traveling element or carriage of the machine. I also provide means for rendering the automatic shifting means inoperative, and other means manually operative to shift the stop member 72, said manually operated means being employed when the automatic means is inoperative. The automatic shifting means for the stop member 72 comprises a forked or bifurcated arm 79, the arms 80 of the bifurcation extending into a circumferential groove or depression 81 formed in the hub portion 76 of the stop member 72, the construction being clearly shown in Figs. 1, 5 and 6. The upper end of the arm 79 is provided with a collar 82 formed with a central opening which receives the inner end of a slide rod 83, said arm 79 being held in a fixed relation with the slide rod by a set screw 84 which passes through the collar portion 82 and abuts against the slide rod. Said slide rod has its bearings in the right-hand lug 50 of the pair in which the driving shaft 47 is journaled and in a smaller lug 85 depending from the under side of the top plate at the left of the right hand lug 50. A collar 86 is secured to the slide rod 83 near its right hand end by a set screw 87, said collar at its top being provided with two V-shaped depressions or notches 88 and 89. Coöperative with the notches is a roller detent 90 mounted at the free end of a spring arm 91 which is secured to a lug 92, depending from the top plate, by a headed screw 93. The construction is such that when the slide rod is shifted lengthwise to and fro by means presently to be described it will be maintained against accidental displacement in either of the positions to which it may be moved, by the coöperation between the detent 90 and one or another of the notches or depressions 88 and 89.

A collar 94 is mounted on the slide rod 83 between its bearing lugs, said collar being secured in a fixed relation with said slide rod by a set screw 95. Projecting from the rear of the collar 94 is a pin or stud 96 best shown in Fig. 1, said stud being normally horizontal and engaging with a slot 97 formed in the lower end portion of one arm of a shifting member 98, said member being in the form of a lever which is fulcrumed on a shouldered screw 99, said shouldered screw being supported in a right angled bracket 100 which is fixed to the underside of the top plate by headed screws 101. The shifting member or lever 98 is substantially vertically disposed and its upper end portion extends upward through a slot or opening 102 in the top plate of the machine. At its upper end the lever 98 is provided with two ears or lugs 103 and 104, the inner oppositely disposed contact faces whereof are in planes radial of the center about which the lever 98 turns. This construction will be understood from a consideration of Fig. 2 and it will be noted from an inspection of said figure that an opening of considerable width is left between the lugs 103 and 104, said opening being designated by the numeral 105. The lugs 103 and 104 on the ribbon shifting member 98 are coöperative with a lug or arm 106 carried by and forming part of a second shifting member 107, said member 107 being best shown in Fig. 14. The member 107 is in the form of a rod or bar which, for the greater part of the length of its body portion 108, may be cylindrical in cross-section, but with the top and bottom faces flattened as indicated at 109, the shape of the cross section of the bar being best shown in Figs. 8 and 9. Adjacent to the lug or arm 106 which is located about midway of the length of the body portion 108 the bar is provided with a forwardly projecting portion or rib 110 and the arm 106 curves forwardly and downwardly from the rib as shown in Figs. 14, 8 and 1. To the right of the arm 106 the body portion of the shifting member 107 is formed with a series of forwardly projecting and horizontally disposed teeth 111, said teeth being at regular intervals, preferably two letter spaces apart, thereby forming openings 112. The flat top surface 109 of the bar adjacent to the teeth 111 is preferably provided with a scale (Fig. 14) to enable the member 107 to be adjusted readily in desired positions. The right hand end portion of the bar 108 is reduced in diameter and receives a knurled finger button 114 which is secured in place by a rivet 115. The left hand end of the bar 108 receives a rod 116 of comparatively small diameter and shorter than the bar proper. The rod is fixedly secured in the bar so that practically they are one piece. If preferred, of course, the rod and bar may be made of a single piece of metal, the left hand end portion of which may be reduced to form the rod 116. Said rod bears in a depending arm 117 of a bracket 118 which is secured to the rear bar 19 of the carriage by a headed screw 119 (Figs. 1 and 2). The right hand end of the end portion of the shifting member 107 is supported in an opening or key hole slot 120 formed in the lower end portion of a curved supporting arm 121 which is best shown in Fig. 10, the upper end portion of said arm being provided with openings 122 through which pass headed screws 123, said screws being received in tapped holes in the inner face of the right-hand side bar 18 of the carriage and serving to secure the arm 121 in a fixed relation with said carriage, as will be best understood from an inspection of Fig. 2.

As shown in Figs. 2 and 10, the lower end portion of the arm 121 beneath the key hole slot 120 is provided with a lateral off-set or extension 124 which coöperates with the teeth 111 to assist in preventing the member 107 from turning on its longitudinal axis in its support. A latch 125 is pivoted at 126 on the arm 121 and said latch is notched at its free end as indicated at 127 to engage with the top and the side of one or another of the teeth 111 as shown in Fig. 8. The latch 125 and the off-set 124 coöperate normally to prevent turning movement of the member 107 on its axis. By throwing up the latch the member may be given a rotary movement on its supports to bring the teeth 111 in register with the narrow part of the key hole slot 120 so as to enable the member 107 to be adjusted in its supports longitudinally of the carriage. When it is desired to make such adjustment the carriage is drawn to the right across the top plate until the right hand end portion of the carriage clears said top plate, as shown in Fig. 2, then the latch 125 may be swung upward and the member 107 turned by means of the finger button 114 and pushed leftward or pulled rightward in its supports until the desired number on the scale on the top of the member 107 is within the opening in the supporting arm 121.

As will be understood from an inspection of Fig. 14 the scale numbers designate the various openings 112 between the teeth 111 so that after the desired number (50 for example) is within the opening or key hole slot 120, if the bar be turned down again to normally position the two teeth 111 at either side of the opening, indicated by the scale number 50, will embrace the sides of the arm 121 and prevent accidental longitudinal movement of the member 107. It will be apparent that this longitudinal adjustment of the ribbon shifting member 107 will serve to vary the position of the arm 106 longitudinally of the carriage, so that when the carriage is moved to and fro across the top plate, said arm 106 will coöperate with the ribbon shifting member or lever 98 at different points in the carriage travel. It will further be apparent that when the arm 106 engages with one or another of the lugs or projections 103 and 104 on the lever 98, said lever will be turned on its pivot 99 and will operate to move the slide rod 83 to shift or vary the position of the stop member 72 and bring one or another of the stopping portions of said member into position to coöperate with the stop 64 on the operating lever 58, to automatically vary the throw of the vibratory ribbon carrier and serve in effect as a ribbon field-changer. The carriage may be moved from left to right by operating the usual release key and may be restored in the usual manner, thereby causing the two ribbon shifting members to coöperate as above described; or, said carriage may, of course, be moved to effect such coöperation by the usual letter spacing operations. In the present instance, however, I prefer to employ tabulating devices to cause movements of the carriage when it is desired to shift automatically to provide for a change from one ribbon field to another, as such automatic shifting is preferably used in work, tabular in form, and work of this character is facilitated by the use of tabulating mechanism.

The tabulating mechanism shown in the present case is substantially the same as that employed in the Monarch typewriting machine and forming the subject-matter of the patent to Gabrielson No. 784,317 dated March 7, 1905. It is illustrated in Figs. 1 and 2 and comprises a stop arm 128 which is secured at the back of the rear carriage bar 19 and extends horizontally therefrom. Coöperative with the stop 128 are one or more column stops 129, said stops being adjustable longitudinally of a toothed stop bar 130 journaled in arms 131 extending rearwardly from the standards 22. A crank arm 132 extends horizontally and forwardly from the right hand end portion of the column stop bar 130, said arm 132 being connected by a link 133 with a sub-lever 134, said sub-lever being pivoted on a shouldered screw 135 which is secured in a lug 136 projecting inward from the right hand side of the base 1. The sub-lever is formed with an upward extension 137 having a slot 138, said slot receiving a pin or stud 139 extending laterally from a tabulating key lever 140, said key lever being fulcrumed on the fulcrum plate 5 and being provided at its forward end with a key button 141. It will be understood that when the tabulating key 141 is depressed it operates through the sub-lever 134 to draw down the link 133, the latter through the crank arm 132 effecting a turning movement of the stop bar 130 in its bearings, thereby turning the column stops 129 forwardly into position to arrest the carriage stop 132 when the carriage is released, said column stops 129 being normally in inoperative position out of the path of the carriage stops as shown in Fig. 1.

In order to effect the release of the carriage when the tabulating key is operated, an arm 142 is adjustably secured to the link 133 in position to engage, when the link is drawn downward, with the right-hand arm of a release lever 143, said lever being pivoted at 144 in a bracket 145 depending from the under side of the top plate. The inner or left hand arm of the release lever 143 is connected at 146 with a release arm or lifting member 147, said member extending upward through an opening 148 in the top plate and being bifurcated at its upper end, the arms 149 of the bifurcated portion being disposed at the sides of the shaft 26ª and being guided on said shaft, said arms being bent horizontally forward at their upper ends to provide lifting shoes 150. The lifting shoes normally lie beneath and out of contact with the carriage feed rack 25 but it will be understood that when the tabulating key is operated the lever 143 will have its right hand arm depressed and its left hand arm raised, thereby moving the lifting member 148 upwardly and causing the lifting shoes 150 to engage the rack 25 and swing said rack upwardly about its pivots 24 to effect a disengagement between it and the feed pinion 26, thereby releasing the carriage.

The present form of my invention is shown as arranged to write the left hand portion of the work sheet, comprising one or more columns, in black, and to change automatically to write in red at a predetermined point in the carriage travel, said point in the present instance being, say, at 52 on the scale. A margin of safety of a distance corresponding to about two letter spaces is preferably left between the point at which the member 107 operates to shift the stop member or ribbon field-changer and the point at which the carriage is thereafter arrested by the coöperation between the tabulating stops. For this reason, after the columnar field in which the new ribbon field is first to be used has been determined by the setting of one of the adjustable column stops the adjustable ribbon changing member 107 should be set to operate at least two spaces in advance of the arrest of the carriage by the column stop. It will be recalled that the adjustable ribbon changing member 107 has been described as having been set at 50 on the scale. It will be understood from what has just been said that this point 50 is determined after the setting of the column stop and that the setting of the adjustable member 107 depends on the point at which said column stop has previously been set. In the present instance this point has been assumed to be 52 on the scale. The shifting member 107 having been adjusted as previously described, one of the column stops 129 having been adjusted to arrest the carriage at a point in its travel corresponding to 52 on the carriage scale, and the work sheet having been entered in the machine and fed around with the platen in the usual manner until the proper position is attained for writing the first item on the account or bill, the carriage will be started from the left and the first portion of the first line will be written by operating the appropriate key levers in the usual manner. Assuming that during the writing of the initial portion of the line, the stop member 72, its shifting devices comprising the forked arm 79, the slide rod 83 and the shifting lever 98 which actuates said slide rod are in the positions illustrated in Fig. 2, it will be apparent that at printing operation the ribbon vibrator 51 and its actuating devices comprising the operating lever 58 and the link 69 will be moved from the positions shown in Fig. 11 to those shown in Fig. 12, thereby throwing the ribbon from the normal position illustrated in Fig. 11 upward until the field $a$ or the black field of said ribbon covers the printing point and is in position to coöperate with the type. From an inspection of Fig. 12 it will be apparent that the upward throw of the ribbon is positively arrested by the engagement of the stop 64 on the operating lever 58 with the stopping portion 73 of the stop member 72. It will also be apparent that after the stoppage or arrest of the operating lever 58, further downward movement of the universal bar and the link 69 will be permitted by the spring connection 67 between said link and said operating lever. It is to be understood of course that the first or black portion of the line may comprise a number of entries in different column fields; that the second or red portion of the line may also comprise entries in different column fields; that said column fields in part are defined by column stops 129, and that the tabulating key may be operated to cause the carriage to jump from one field to the next. It is only during one particular jump or run in the line, however, that the ribbon shifting members automatically coöperate. Let it be assumed that the initial portion of the first line has been written in black, leaving the carriage and the other parts in the positions illustrated in Fig. 2. The tabulating key 141 may now be operated, swinging the column stop 129, which is at 52 on the stop bar, into operative position and lifting the rack 25 to free the carriage from its step-by-step feeding mechanism. Thereupon the main spring will operate to draw the carriage rapidly leftward across the top plate until the tabulating stop 128 on the carriage coöperates with the column stop 129 to arrest the carriage at the predetermined columnar field starting at 52 on the scale. During the jump or free movement of the carriage leftward, the arm 106, traveling with the carriage, approaches the projecting portion 103 of the lever 98 some four letter spaces prior to the arrest of the carriage. Said arm 106 contacts with the projection 103 so that during the further leftward movement of the carriage prior to its arrest, the upper arm of said lever 98 will be turned leftward about its pivot, this leftward movement continuing for some four letter spaces which, in the present instant, brings the carriage to the point where it will be arrested by the coöperating tabulating stops.

As the upper arm of the lever 98 is turned, the projection or lug 103 will be gradually turned down out of the path of the arm 106 so that at the end of the four letter space movements said projection 103 will have been moved so far that the arm 106 will no longer affect it. At the same time that the projection 103 is turned or swung downwardly the projection 104 will be swung upwardly behind the arm 106 in position to coöperate with it on the return movement of the carriage. The turning of the upper arm of the lever 98 to the left under the influence of the arm 106 causes the lower arm of said lever to swing rightward. During the rightward movement of the lower arm it operates through the pin or stud 96 on the slide rod 83, moving said slide rod longitudinally rightward in its bearings and causing the stop member 72 to slide on the driving shaft 47 rightward from the position illustrated in Fig. 2 to that shown in Fig. 5. From an inspection of these two figures it will be seen that the extent of movement of the member 72 rightward is equal to the distance between the V-shaped depressions 88 and 89 in the collar 86 on the slide rod 83, said movement continuing until the roller detent disengaging from the depression 88 fully engages with the depression 89. The movement of the member 72 rightward along the driving shaft 47 is sufficient to move the stopping portion 73 out of the path of the stop 64 and to bring the stopping portion 74 into the path of the stop 64 as shown in Fig. 5. Consequently during subsequent printing operations in the line of writing, the vibrator and its actuating devices will be moved from the position shown in Fig. 11 to that shown in Fig. 13. From an inspection of the latter figure it will be observed that the operating lever 58, swinging downward until arrested by the contact of the stop 64 with the stopping portion 74, will move through a greater distance than it did when the stop portion 73 was in position, the increased movement serving to throw the vibrator upward until the field b of the ribbon or the red field covers the printing point. Consequently the printing of the remaining portion of the line on the work sheet will be in red. At the end of the line the carriage and other parts will be in relations illustrated in Fig. 5. The platen may now be line spaced in the usual manner and the carriage restored by hand from left to right to begin the next item on the account. During the return movement of the carriage the arm 106 on the stop member 107 will engage with the projection 104 on the lever 98 as shown in Fig. 6 and will swing said lever from the position shown in Figs. 5 and 6 back to the position shown in Fig. 2, restoring the stop member 72 from the position shown in Figs. 5 and 6 to that shown in said Fig. 2. Consequently the writing of the first part of the new line will be in black and when the tabulating key is operated the field-changing mechanism will be automatically readjusted as above described to cause the printing of the rest of the line in red. The operations above outlined may be, of course, repeated as often as desired, the to-and-fro movements of the carriage causing an automatic shifting or changing of the working field of the ribbon from black to red and vice versa.

At times it may be desirable to print an entire line or succession of lines in a single color and I provide means for manipulating my improvements to accomplish this result readily. One form of said means is clearly shown in Figs. 2, 5 and 6 of the drawings and comprises a rod 151 of comparatively small diameter which is fixedly secured at its inner end in the right-hand end of the slide rod 83. The outer end portion of the rod 151 extends through an opening in the right-hand side plate 152 of the machine and has fixed to it a finger button 153. When it is desired to dispense with the automatic shifting of the ribbon the latch 125 is swung upwardly about its pivot 126, thereby freeing the ribbon shifting member 107, which member may then be given a half turn in its bearings from the position shown in Fig. 8 to that shown in Fig. 9, after which the latch 125 may be dropped, locking said member 107 in its new position. In this position as will be seen the arm 106 is inoperative on the ribbon shifting lever 98 so that during the to and fro movements of the carriage, said lever 98 will not be affected. By pushing in or pulling out the finger button 153 the slide rod 83 may be moved longitudinally to shift the stop member 72 and bring the desired stopping portion 73 or 74 into operative position, said stopping portion of course, remaining operative until the stop member 72 is again manually shifted. When it is desired to return to the automatic shifting or changing of the ribbon fields, the member 107 will be restored to the position illustrated in Fig. 8.

A modified construction of manual shifting mechanism is illustrated in Figs. 15 and 16. In the modified form a collar 154 is secured to the right-hand end portion of the slide rod 83, said collar carrying an upwardly extending pin or stud 155 which operates in slots 156 and 157 formed in a cam member or slidable plate 158, said plate being provided with guide slots 159 which receive headed guiding and supporting screws 160, said screws entering tapped holes in the under side of the top plate, first passing through depending bosses or opening sleeves 161. The screws 160 serve to maintain the slide plate 158 close against the bottom faces of the bosses 161, and guide and support the slide plate when it is moved fore and aft of the machine in a manner presently to be described. The slide plate 158 is pivotally connected by a double headed pin or loose rivet 162 with a curved link 163 which extends forwardly beneath the top plate and is connected by a loose rivet 164 with a lever 165, said lever being fulcrumed on a shouldered screw 166 which enters the underside of the top plate passing through a boss 167 and serving to maintain the lever 165 close against said boss. The outer or free end of the lever 165 extends laterally beyond the right hand side edge of the top plate of the machine and is provided with a handle or finger piece 168 by which it may be manipulated to shift the slide plate 158 fore and aft on its bearing screws 160. From an inspection of Fig. 15 it will be noted that the slots 156 and 157 in said slide plate are angularly disposed to each other and are connected at their ends. During the normal automatic operation of the mechanism in the manner previously described, the slide rod 83 will be longitudinally reciprocated and the pin or stud 155 thereon will be moved to and fro in the slot 156. When it is desired to dispense with the automatic ribbon shifting, the member 107 is turned to inoperative position as shown in Fig. 9. The handle 168 on the lever 165 may then be pulled forward, sliding the plate 158 rearwardly and causing the pin 155 to enter the slot 157, the edge of said slot serving as a cam to force said pin and with it the slide rod 83 rightwardly until the roller detent 90 disengaging from the V-shaped depression 88 engages with the depression 89 in the collar 36. As has been previously explained, this movement of the slide rod serves to move the stop member 72 rightward transversely of the operating lever 58 and brings the stopping portion 74 on said member into operative position. When it is desired to dispense with the manual shifting mechanism and again operate the ribbon field-changing devices automatically, the shifting member 107 may be restored to operative position but prior thereto care should be taken to shift the slide plate to the position shown in Fig. 15 so that the pin 155 may move freely back and forth in the slot 156, for, if the slide rod were shifted to its rearmost position and the pin 155 were left in the slot 157 to and fro movement of the slide rod 83 under the influence of the shifting members 98 and 107 would be prevented.

Certain of the features disclosed herein are claimed in my companion application Serial No. 332,949, filed September 1, 1906. The claims of the present case are directed to features not embodied in said application.

Various changes may be made within the scope of my present invention.

What I claim as new and desire to secure by Letters Patent, is:—

1. In a typewriting machine, the combination with a carriage, step-by-step feeding mechanism therefor, types, a ribbon having fields of different characteristics, ribbon feeding mechanism, and tabulating mechanism including stops coöperative to arrest the carriage in a predetermined columnar position, of a shifting member operatively connected with the carriage and independent of the tabulating stops; a coöperating shifting member mounted on the frame of the machine; and means controlled by said shifting members for automatically changing the field of the ribbon exposed to the action of the types.

2. In a typewriting machine, the combination with a carriage, step-by-step feeding mechanism therefor, types, a ribbon normally removed from the printing point and having fields of different characteristics, ribbon feeding mechanism and tabulating mechanism including stops operative to arrest the carriage when released from its step-by-step feeding mechanism in predetermined columnar positions, of a shifting member operatively connected with the carriage and independent of the tabulating stops; a coöperative shifting member mounted on the frame of the machine; and means controlled by said shifting members to alter the extent of movement of the ribbon so as to change the ribbon field exposed to the types, said means operating during the movement of the carriage to a predetermined columnar position.

3. In a typewriting machine, the combination with a carriage, step-by-step feeding mechanism therefor, types, a ribbon having fields of different characteristics, a ribbon vibrator, ribbon feeding mechanism and tabulating mechanism including stops operative to arrest the carriage when released from its step-by-step feeding mechanism in predetermined columnar positions, of a shifting member operatively connected with the carriage and independent of the tabulating stops; a coöperating shifting member mounted on a fixed part; and means controlled by said shifting members and operative during the movement of the carriage to a predetermined columnar position to vary the throw of the vibrator and thereby change the field of the ribbon exposed to the types.

4. In a typewriting machine, the combination with a carriage, step-by-step feeding mechanism therefor, types, a ribbon having fields of different characteristics, a vibrator, actuating devices for the vibrator, ribbon feeding mechanism and tabulating mechanism including stops operative to arrest the carriage when released from its step-by-step feeding mechanism in predetermined columnar positions, of a stop member having a plurality of stopping portions coöperative with certain of said vibrator actuating devices to arrest the same at different points; a shifting member operatively connected with the carriage and independent of the tabulating stops; a coöperating shifting member mounted on a fixed part; and means controlled by said shifting members and operative during the movement of the carriage to a predetermined columnar position to shift or re-adjust said stop member.

5. In a typewriting machine, the combination with a carriage, step-by-step feeding mechanism therefor, types, a ribbon having fields of different characteristics, a vibrator, actuating devices for the vibrator, ribbon feeding mechanism and tabulating mechanism including stops operative to arrest the carriage when released from its step-by-step feeding mechanism in predetermined columnar positions, of a stop member having a plurality of stopping portions coöperative with certain of said vibrator actuating devices to vary the extent of movement thereof; means for shifting said stop member comprising a forked arm and a slide rod; and means for actuating said slide rod, said means including two shifting members, one mounted on a fixed part and the other mounted on the carriage and adjustable in the direction of its length and independent of the tabulating stops, said members coöperating during the run of the carriage to a predetermined columnar position.

6. In a typewriting machine, the combination of a carriage, a ribbon vibrator; a stop member operative to effect a positive arrest of the same at different points in its movement toward the printing point; a slide rod controlling said stop member; a shifting lever fulcrumed on a fixed part and directly connected to said slide rod; and a shifting member carried by the carriage and coöperative directly with the shifting lever to automatically adjust said stop member.

7. In a typewriting machine, the combination of a carriage; a ribbon vibrator; a stop member operative to effect a positive arrest of the same at different points in its movement toward the printing point; a slide rod carrying a forked arm controlling said stop member; a shifting lever fulcrumed on a fixed part and having a direct pin and slot connection with said slide rod; and an adjustable toothed bar mounted on the carriage and adjustable lengthwise thereof, said toothed bar having a portion coöperative directly with said shifting lever to automatically adjust said stop member.

8. In a typewriting machine, the combination of a carriage; a ribbon vibrator; a stop member operative to effect a positive arrest of the same at different points in its movement toward the printing point; a slide rod controlling said stop member; a shifting lever fulcrumed on a fixed part and having a direct pin and slot connection with said slide rod; a shifting member carried by the carriage and coöperative directly with the shifting lever to automatically actuate said slide rod and adjust said stop member; and means for retaining said slide rod in adjusted position.

9. In a typewriting machine, the combination of a carriage; a ribbon vibrator; a stop member operative to effect a positive arrest of the same at different points in its movement toward the printing point; a slide rod carrying an arm controlling said stop member and also provided with a notched collar; a shifting lever fulcrumed on a fixed part and having a direct pin and slot connection with said slide rod; and a shifting member carried by the carriage and coöperative directly with the shifting lever to actuate said slide rod and automatically adjust said stop member; and a detent coöperative with the notched collar of said slide rod to maintain the latter in adjusted position.

10. In a typewriting machine, the combination of a carriage; a ribbon vibrator; a stop member operative to effect a positive arrest of the same at different points in its movement toward the printing point; a slide rod controlling said stop member; a shifting lever fulcrumed on a fixed part and directly connected to said slide rod, said shifting lever being provided with a pair of lugs or projections spaced apart; and a shifting member operatively connected with the carriage and contactive with one of said lugs on said shifting lever during the travel of the carriage in one direction and with the other of said lugs during the travel of the carriage in the other direction, the coöperation of said member with said lever serving automatically to adjust and re-adjust said stop member.

11. In a typewriting machine, the combination of a ribbon vibrator; a stop member operative to effect a positive arrest of the same at different points in its movement toward the printing point; a slide rod carrying a forked arm controlling said stop member; a shifting lever fulcrumed on a fixed part and having a direct connection with said slide rod; and a shifting member connected to travel with the carriage and contactive with said shifting lever in both directions of the carriage travel to automatically adjust said stop member.

12. In a typewriting machine, the combination of a ribbon vibrator; an operating lever having one arm connected with said vibrator; a key actuated universal bar; an actuating link yieldingly connecting said universal bar with the other arm of said operating lever; a stop member having a plurality of stopping portions adapted to engage said lever to limit its movements; means for automatically actuating said stop member; and means for manually actuating said stop member, said manual means comprising a cam member, a link and a lever provided with a finger piece.

13. In a typewriting machine, the combination with a carriage, a step-by-step feeding mechanism therefor, types, a ribbon normally removed from the printing point and having fields of different characteristics, a ribbon vibrator, ribbon feeding mechanism and tabulating mechanism including stops operative to arrest the carriage when released from its step-by-step feeding mechanism in predetermined columnar positions, of a shifting member mounted on the carriage and adjustable longitudinally thereof, said member being independent of the tabulating stops; a second shifting member mounted on a fixed part; and means controlled by said shifting members and operative during the movement of the carriage to a predetermined columnar position to alter the extent of movement of the vibrator so as to change the ribbon field exposed to the types, said means operating during the return movement of the carriage to restore the ribbon field first operative.

14. In a typewriting machine, the combination with a carriage, step-by-step feeding mechanism therefor, types, a ribbon having fields of different characteristics, a ribbon vibrator, ribbon feeding mechanism and tabulating mechanism including stops operative to arrest the carriage when released from its step-by-step feeding mechanism in predetermined columnar positions, of a shifting member mounted on the carriage and adjustable longitudinally thereof, said member being independent of the tabulating stops; a coöperating shifting member mounted on a fixed part; and means controlled by said shifting members and operative during the movement of the carriage to a predetermined columnar position to vary the throw of the vibrator and thereby change the working field of the ribbon, said means operating during the return movement of the carriage to again render operative the ribbon field first operative.

15. In a typewriting machine, the combination of a carriage; a ribbon vibrator;

means for actuating the same comprising an operating lever; a stop member adjustable transversely of said actuating lever and having a plurality of stopping portions coöperative with said lever to arrest the same at varying points; a shifting lever pivoted on a fixed part and operative to move said stop member; and a toothed bar adjustable on the carriage in the direction of its travel and having an integral arm operative to swing said shifting lever on its fulcrum.

16. In a typewriting machine, the combination with a traveling element or carriage, printing instrumentalities, a ribbon having fields of different characteristics, and means for feeding the ribbon longitudinally, of a shifting lever pivoted on a fixed part; and a shifting member in the form of a toothed bar adjustable on the carriage in the direction of its travel and having an integral projecting portion or arm coöperative with said lever, and means controlled by said shifting members for changing the ribbon field exposed to the action of said printing instrumentalities.

17. In a typewriting machine, the combination of a ribbon vibrator; stop means operative to effect a positive arrest of said vibrator at different points in its movement toward the printing point; shifting devices operatively connected with said stop means and including a shifting member, and a second shifting member adjustable relatively to the first ribbon shifting member and having an arm operative to actuate said first named shifting member, said second shifting member and its arm being rotatable to a position where it is inoperative on said first named shifting member.

18. In a typewriting machine, the combination of a ribbon vibrator; stop means operative to effect a positive arrest of said vibrator at different points in its movement towards the printing point; shifting devices operatively connected with said stop means and including a shifting member; a second shifting member having an integral arm operative normally to automatically actuate said first named shifting member, said second member and its arm being together rotatable to a position where said arm is inoperative on said first named shifting member; and manual means for shifting said stop means.

19. In a typewriting machine, the combination of a ribbon vibrator; stop means operative to effect a positive arrest of said vibrator at different points in its movement towards the printing point, shifting devices operatively connected with said stop means and including a slide rod and a shifting member; a second shifting member operative to actuate automatically said first named shifting member; means for rendering said second shifting member inoperative; and manual means for shifting said stop means, said manual means including a cam member and a lever provided with a finger piece and operatively connected with said cam member.

20. In a typewriting machine, the combination of a ribbon vibrator; stop means operative to effect a positive arrest of said vibrator at different points in its movement towards the printing point; shifting devices operatively connected with said stop means and including a slide rod and a shifting member; a second shifting member operative to actuate automatically said first named shifting member; means for rendering said second shifting member inoperative; and manual means for actuating said shifting devices, said manual means including a slidable plate formed with slots coöperative with a projection on said slide rod, a link connected with said slidable plate and a lever connected with said link and provided with a handle or finger piece.

21. In a typewriting machine, the combination of a carriage, types, inking devices including inking surfaces of different characteristics, and means for automatically changing the inking surface exposed to the action of the types at a predetermined point in the line of writing, said means including a toothed bar adjustable in the direction of carriage travel and retained by its teeth in adjusted position, a contact arm on said bar, and a shifting device operated by said contact arm.

22. In a visible typewriting machine, the combination with a carriage, types, ribbon mechanism including ribbon surfaces of different characteristics, and ribbon vibrating devices, of means for controlling said ribbon vibrating devices to cause one or another of said ribbon surfaces to be exposed to the action of the types, said means including a toothed bar adjustable in the direction of carriage travel and retained in adjusted position by means of said teeth, and means controlled by said bar and controlling said vibrating means.

Signed at Syracuse, in the county of Onondaga, and State of New York, this 30th day of August A. D. 1906.

HERBERT H. STEELE.

Witnesses:
JOHN S. MITCHELL,
W. J. LOGAN.